(12) United States Patent
Krause

(10) Patent No.: US 6,637,793 B2
(45) Date of Patent: Oct. 28, 2003

(54) PICKUP TRUCK RACK WITH ELEVATED PLATFORM WITHIN CANOPY

(76) Inventor: Joshua Krause, 7818 - 130th Ave. NE., Kirkland, WA (US) 98033

(*) Notice: Subject to any disclaimer, the term of this patent is extended or adjusted under 35 U.S.C. 154(b) by 2 days.

(21) Appl. No.: 10/086,899

(22) Filed: Mar. 1, 2002

(65) Prior Publication Data

US 2003/0164621 A1 Sep. 4, 2003

(51) Int. Cl.[7] ................................................ B60R 9/042
(52) U.S. Cl. ....................... 296/3; 296/37.6; 296/37.7; 224/403
(58) Field of Search ......................... 296/3, 37.6, 37.7, 296/100.01, 100.02, 100.17, 164, 167; 224/405, 403

(56) References Cited

U.S. PATENT DOCUMENTS

| | | | | |
|---|---|---|---|---|
| 3,589,576 A | * | 6/1971 | Rinkle et al. | 224/320 |
| 4,065,041 A | * | 12/1977 | Stegavig et al. | 224/327 |
| 4,378,127 A | * | 3/1983 | Rossi, Sr. | 296/3 |
| 4,773,575 A | * | 9/1988 | Morrison, III | 224/405 |
| 5,172,952 A | * | 12/1992 | Lasnetski | 182/127 |
| 5,207,470 A | * | 5/1993 | Rafi-Zadeh | 224/282 |
| 5,423,587 A | * | 6/1995 | Ingram | 135/88.13 |
| 5,439,152 A | * | 8/1995 | Campbell | 108/55.1 |
| 5,476,301 A | * | 12/1995 | Berkich | 224/403 |
| 5,628,540 A | * | 5/1997 | James | 211/189 |
| 5,829,813 A | * | 11/1998 | LaValle | 224/311 |
| 5,893,598 A | * | 4/1999 | Silkowski et al. | 224/403 |
| 6,209,944 B1 | * | 4/2001 | Billiu et al. | 296/100.02 |
| 6,224,140 B1 | * | 5/2001 | Hoplock | 296/100.01 |

* cited by examiner

Primary Examiner—Stephen T. Gordon
Assistant Examiner—Patricia L. Engle
(74) Attorney, Agent, or Firm—David L. Tingey

(57) ABSTRACT

A truck rack with a platform mounts over a pickup bed and within a pickup canopy, leaving a generally unobstructed view through the pickup rear window. The a platform is supported above the cab rear window in its store position but lowered on one end for loading as the other end pivots on a rack frame. To minimize valuable space within the canopy above the window, the platform locates in store position between upper frame members. Supporting legs are length adjustable to position the frame and platform above the rear window. Sleeves mountable to a truck bed side have a hole through the sleeve receives a frame leg. Each leg has a plurality of holes matching the sleeve hole. To select a preferred leg length in positioning the upper frame and platform above the rear window, a bolt passes through a selective leg hole aligned with the sleeve holes. To accommodate various pickup truck models having differing bed width dimensions, a plurality of frame mounting brackets securable to the bed sides extend inward therefrom with the frame legs mounted on the brackets interior of the bed sides and within the canopy.

13 Claims, 5 Drawing Sheets

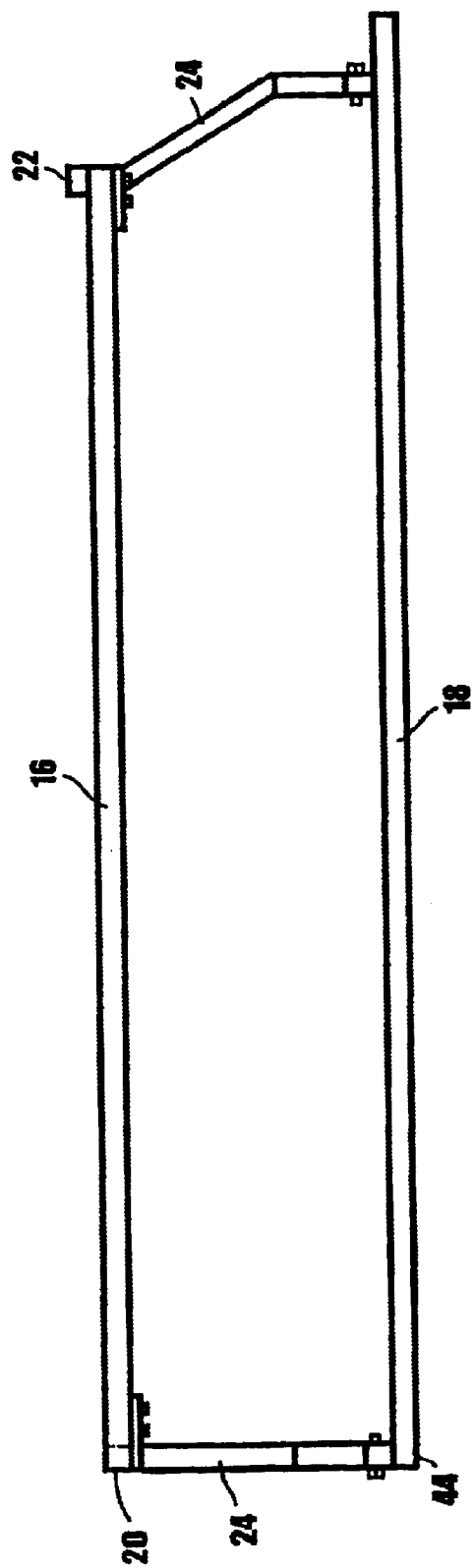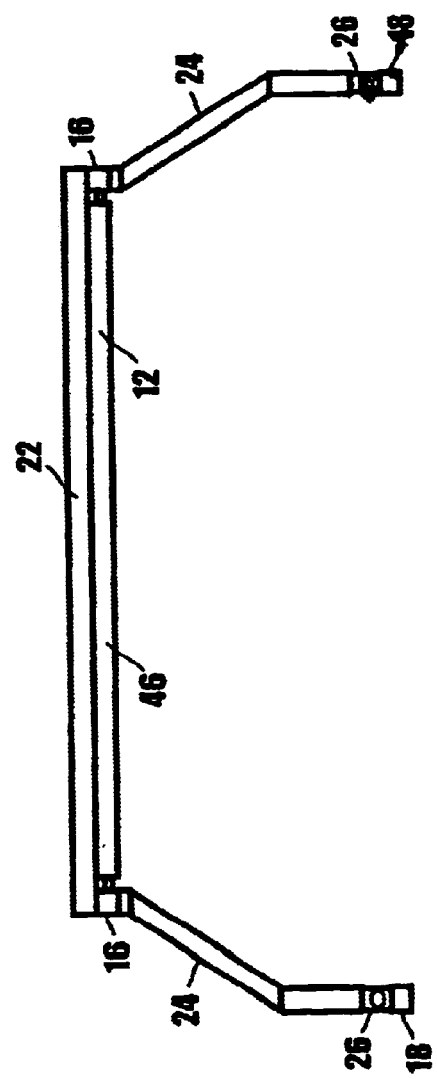

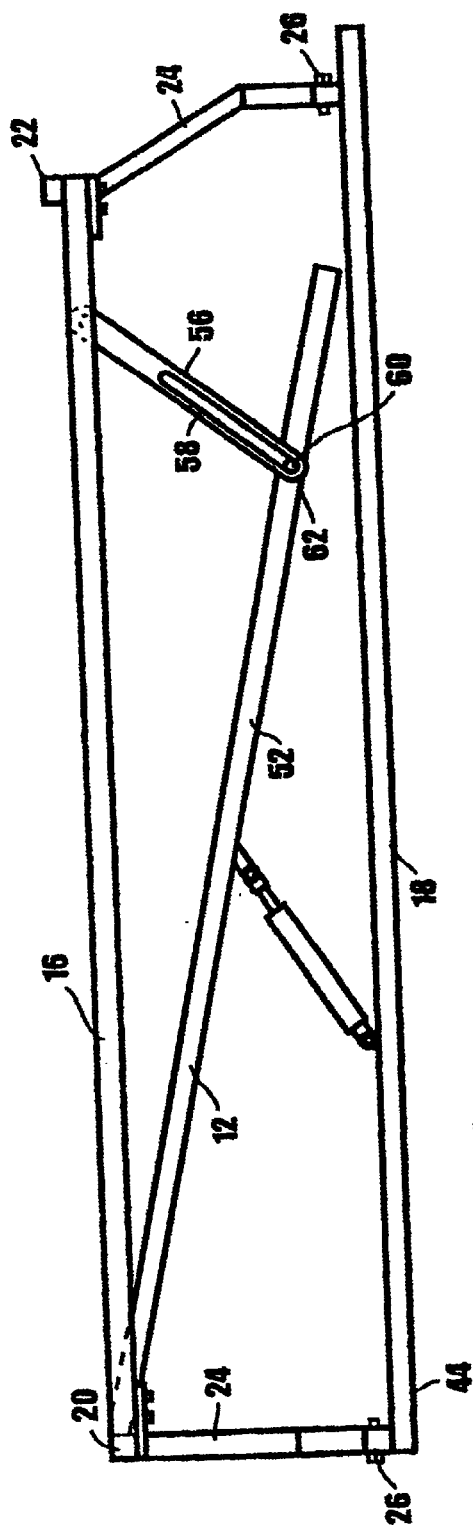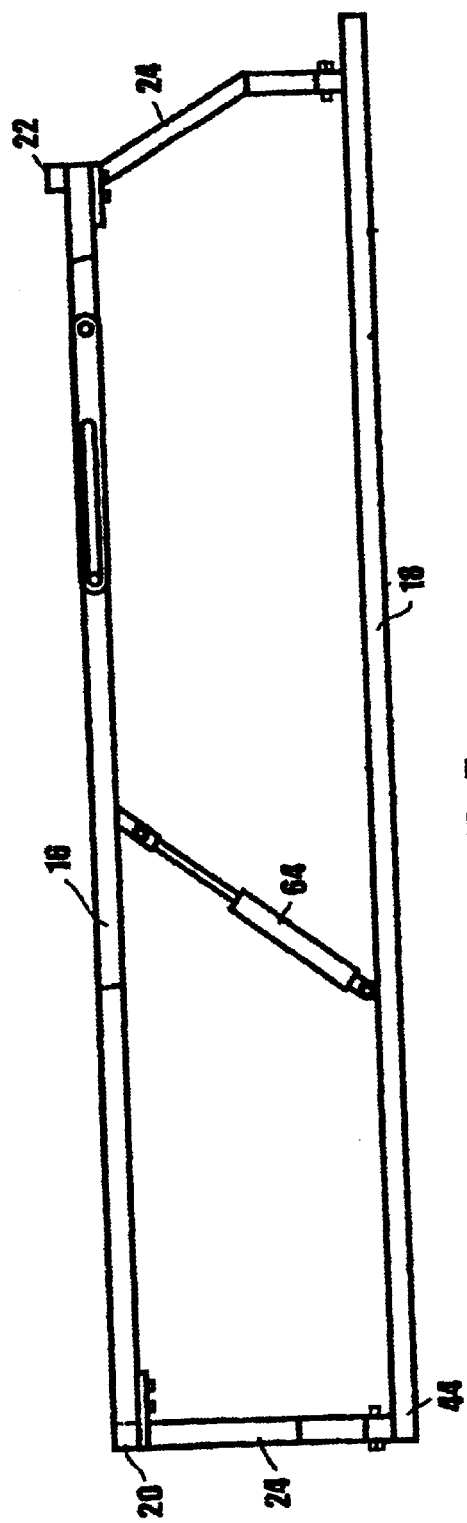

PICKUP TRUCK RACK WITH ELEVATED PLATFORM WITHIN CANOPY

BACKGROUND

1. Field of the Invention

This invention relates to pick truck racks and, more particularly, pickup truck racks suitable for use inside canopies mounted on a pickup truck bed.

2. Prior Art

It is well known to have truck racks for pickup trucks. Truck racks generally provide a frame elevated above the truck bed on which various cargo can be carried. Typically, such racks are positioned over the cab rear window to the truck driver still has full view through his rear window. It is also well known to have canopies that mount over a pickup truck bed on bed sides. (For purposes herein, a truck "canopy" is construed in the normal vernacular as that which is mounted as an enclosure over a truck bed, including a roof and sides around a support structure together comprising the whole of a truck canopy.) The canopy adds a measure of security for cargo carried in the truck bed and also offers protection from the weather. However, use of the canopy also generally limits the area in which cargo can be carried. Conventional truck racks are generally not compatible with use of a canopy, though it is known to have a truck rack that mounts around and outside of a canopy. It is not common however to have a rack that mounts over the truck bed inside of a canopy also mounted over the truck bed, thus offering the security and protection of a canopy for cargo loaded onto the rack while still providing full view to the rear of the truck through the truck rear window.

SUMMARY OF THE INVENTION

It is the primary object of the present invention to provide a truck rack with a platform, that is, a raised flooring, over a pickup bed and within a pickup canopy. To accommodate a generally unobstructed view through the pickup rear window, it is a second object that the platform be mounted above the rear window but still within the pickup canopy. These objects are achieved in a frame supporting a platform supported above the cab rear window in normal use but lowered for loading. Thus, the bed of the truck is still available for normal use in hauling materials and relatively large parts and equipment, while smaller parts and equipment may be stored above the truck bed on the supplemental platform over the bed and above the cab window.

Because different manufactures and truck models may have different dimensions of the rear window, it is a third objective that the legs supporting the frame on which the platform is mounted be length adjustable. This object is achieved in sleeves mountable to a truck bed side with a hole through the sleeve receiving a frame leg having a plurality of leg holes matching the sleeve hole. To select a preferred leg length, a bolt passes through a selective leg hole aligned with the sleeve holes.

It is a fourth object that the platform be accessible for easy loading. This object is achieved in the platform pivoting on pivot pins from a frame first end at a platform first end between (a) a store position with a platform second end latched to a frame second end securing the platform within the channel between the frame side members and (b) a loading position with the platform second end unlatched and lowered from the frame It is a fifth object that the platform and the frame supporting it minimize vertical space occupied by the frame and platform to maximize volume above the platform available for cargo, recognizing that volume above the rear window and below the canopy is limited, especially for a canopy the height of the cab. This object is achieved in the frame comprising upper and lower parallel side members and first and second cross members between upper parallel side members, the second cross member over the upper parallel side members forming an inverted U channel and frame legs supporting the side members over the truck bed, extending between the bed sides and the side members. The pivoting platform fits between the upper parallel side members of the channel in its store position.

It is a sixth object that the platform second end when unlatched and lowered from the frame be supported. This object is achieved by at least one support member extending between the frame and one of said frame side members, the support member having a longitudinal slot with a slot pin extending from the side member and through the slot and sliding therein as the platform moves between its store and loading positions, resting on a slot platform end to support the platform hanging by the support member from the frame.

It is a seventh object that the rack adapt to different bed dimensions of different vehicles, particularly the transverse distance between bed sides. This object is achieved in a plurality of frame mounting brackets secured to the bed sides and extending inward therefrom, the frame legs mounted thereon interior of the bed sides and within the canopy.

It is an eighth and last object that the platform be assisted in lifting it from its load position to its store position. This object is achieved in a lift assist member on each platform side between the platform and a lower parallel side member. Typically, the lift assist member comprises a spring that is compressed as the platform moves from its store position to its load position, releasing compression energy to assist the platform as it moves from its load position to its store position, though any comparable assist mechanism is suitable and deemed a part of embodiment of the rack.

BRIEF DESCRIPTION OF THE DRAWINGS

FIG. 3 is a side plan view of the frame with platform.

FIG. 4 is an end plan view of the frame with platform.

FIG. 5 is a side view of the frame in its store position showing a load assist member and a support member.

FIG. 6 is a side view of the frame showing the platform lowered to its loading position, hanging on its support member and assisted in lifting by its assist member.

DETAILED DESCRIPTION OF PREFERRED EMBODIMENTS

Figure 1:
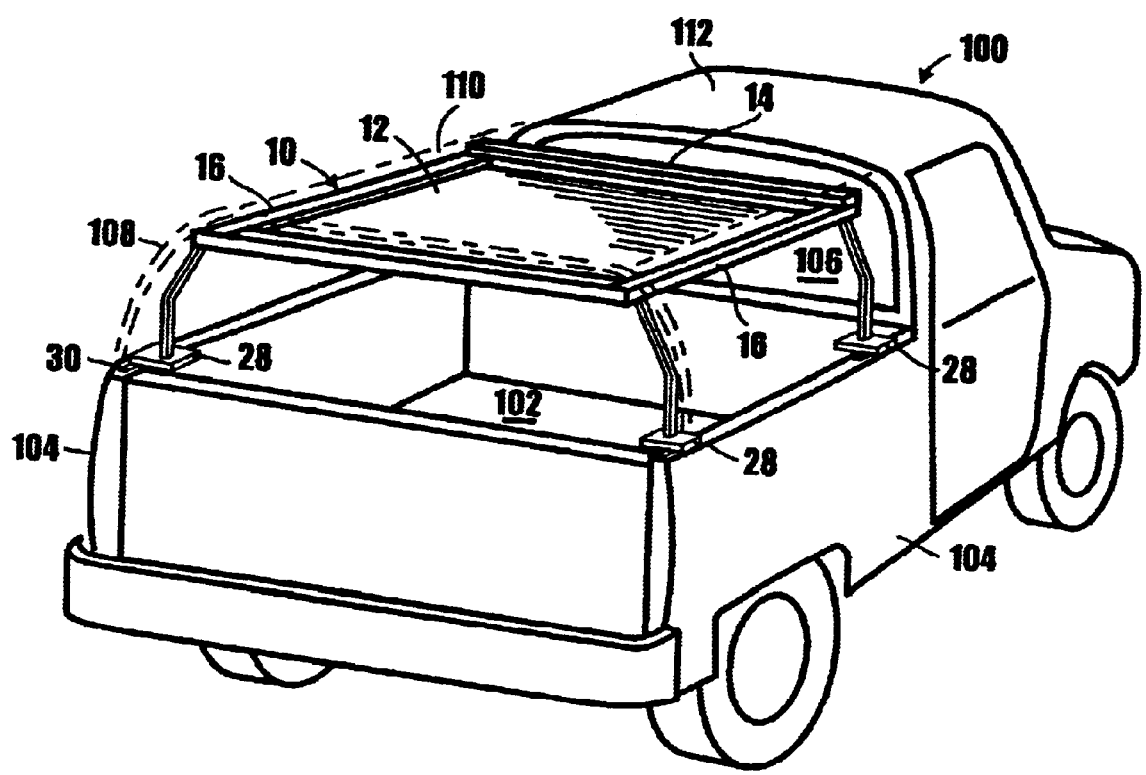
FIG. 1 is a perspective view of the rack on a pickup truck bed under a canopy.
Figure 2:
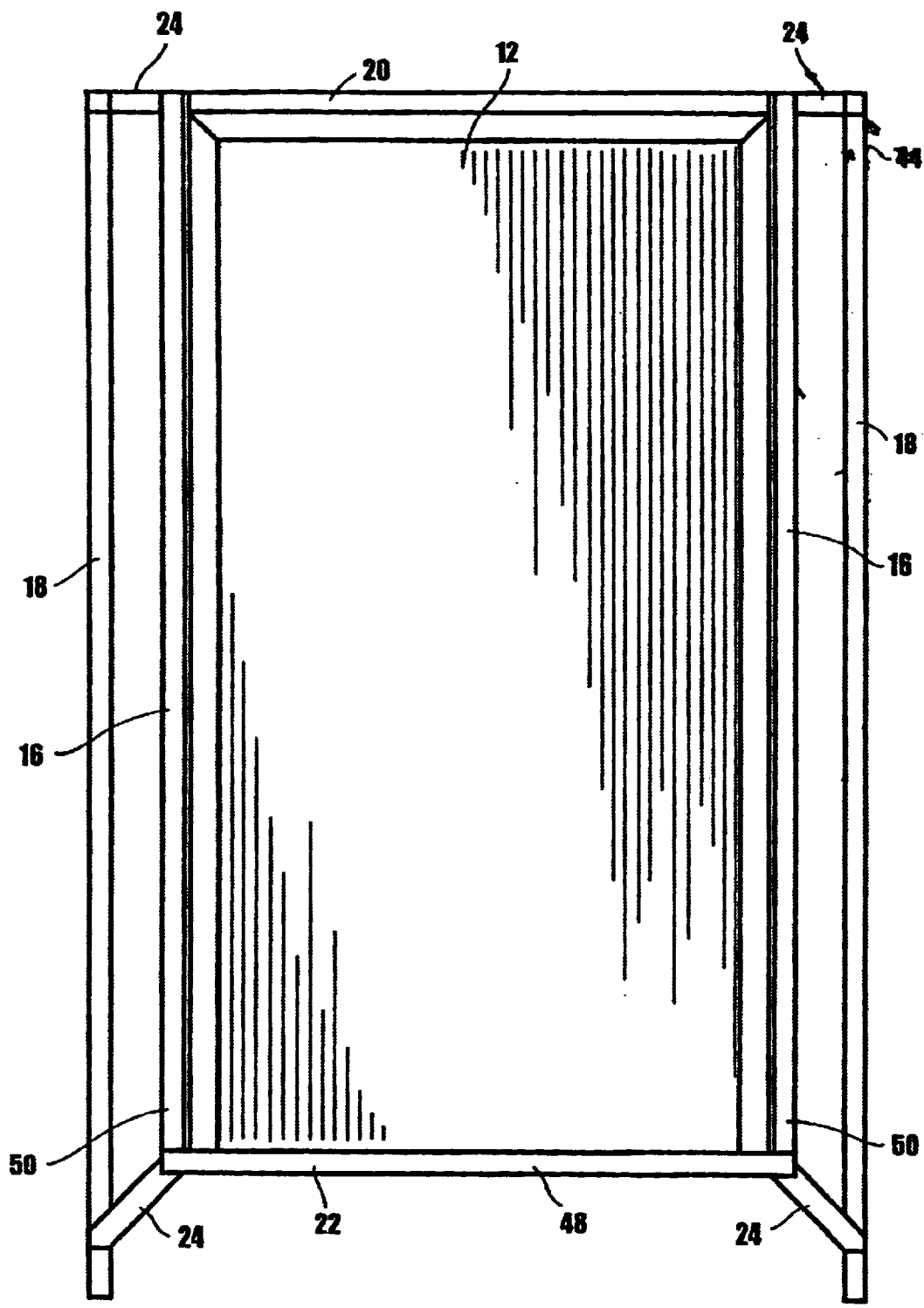
FIG. 2 is a top plan view of the frame with platform.
Figure 7:
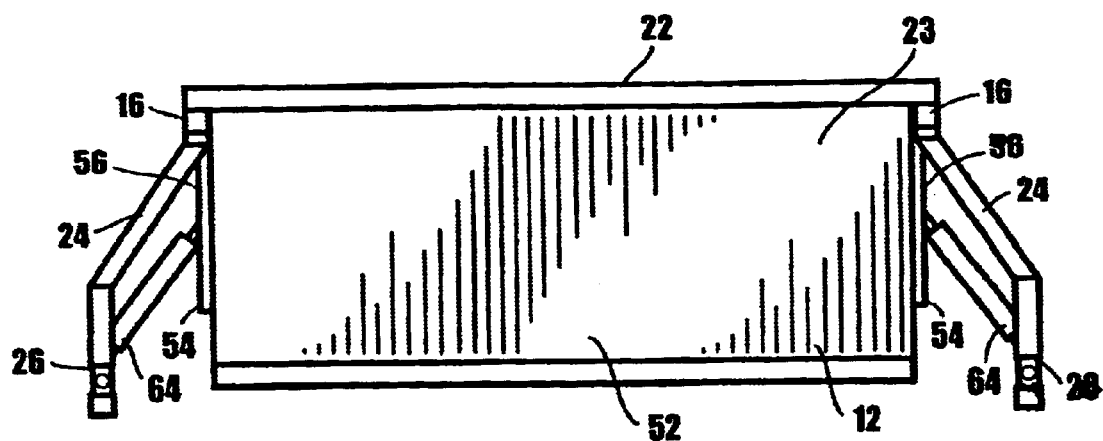
FIG. 7 is an end view of the frame with the platform in load position.
Figure 8:
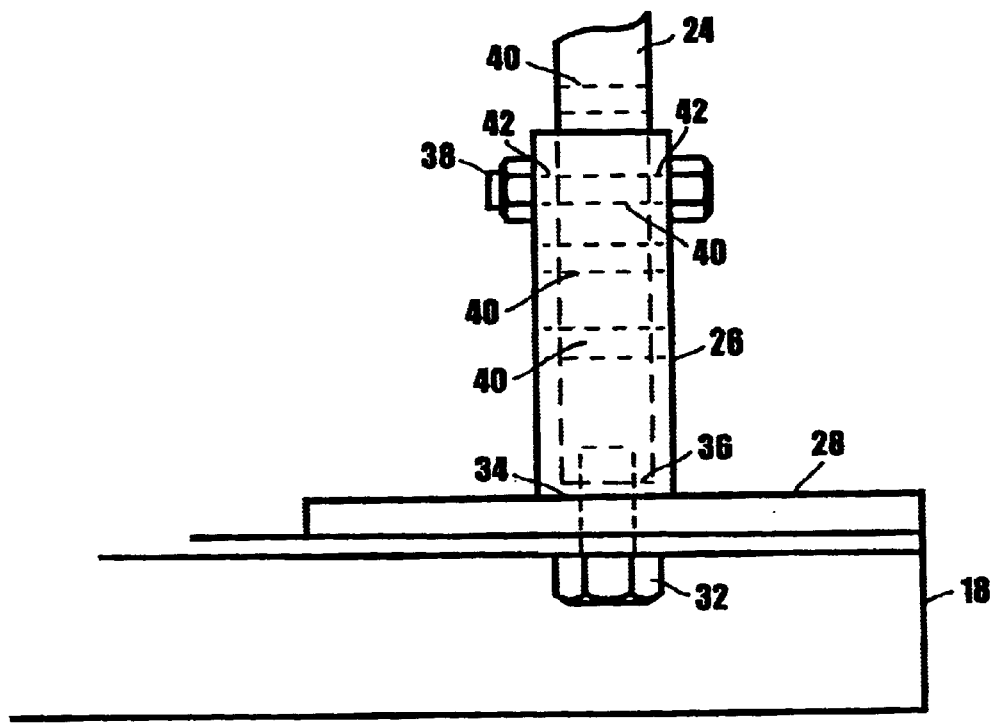
FIG. 8 is an end view the frame leg with a plurality of holes received into a mounting bracket with a sleeve, a bolt passing through a sleeve hole and an aligned selective leg hole.

The truck rack 10 of the present invention is in:tended for use with a pickup truck 100 with a pickup bed 102 and bed sides 104. The pickup truck 100 includes a rear window 106 in its cab and a canopy 108 on its bed resting on the bed sides with a roof 110 that reaches at least the roof 112 of the cab.

The rack 10, additional to and separate and apart from the canopy, provides a platform 12 mounted over the truck bed 102 independent of and within the canopy 108, providing an additional area on which various parts may be carried within the security and protection of the canopy. So the platform 12 and parts carried on the platform do not obstruct view through the rear window, a frame 14 supports the platform 12 above the rear window 106 generally. However, it is recognized that the platform 12 may locate slightly within the window, a small distance below the top of the window while virtually leaving of the window clear of the shelf and still provide a clear view to the rear of the pickup. This circumstance is deemed within the meaning of the term 'above the rear window' and intended to be included in the bounds of the invention.

The frame 14 of the truck rack 10 is mountable on the truck bed sides 104 within the canopy 108, which is also mounted on the truck sides 104. The frame 14 comprises upper and lower parallel side members 16 and 18 and first and second cross members 20 and 22 extending between upper parallel side members 16. The lower parallel side members 18 are mountable to the bed sides and the second cross member 22 lies over the upper parallel side members 16 to form an inverted U channel 23. Frame legs 24 support the side members 20 and 22 over the truck bed 102, extending between the upper and lower side members 16 and 18.

The legs 24 are length-adjustable so the upper parallel side members 16 and cross members 20 and 22 can be positioned above the rear window of the cab and adapt to trucks of different dimensions.

Because truck beds from differing manufacturers have varying dimensions, for the rack to fit universally in the several beds, attachment of the frame legs 24 to the bed 102 must also be adjustable transversely. To achieve the transverse adjustment while retaining use of a common frame, a plurality of sleeves 26 are mountable to bracket plates 28 secured to the bed sides 102, extending inward from the bed sides, each having a transverse slot 30. A plate bolt 32 through the slot 30 at a preferred position along the slot is tightened into a threaded hole 34 in the sleeve base 36, thus securing the sleeve in a selective transverse position on the bracket plate 28. The bracket plate 28 is typically affixed to the lower parallel side member 18 which is member mountable to the bed side, typically by bolting the member 18 to the side cap or the bracket plate 28 may be bolted directly to the bed side 102 without use of the lower parallel side member 18. To achieve a frame height adjustment, the legs fit into the sleeves, respectively. A sleeve bolt 38 passes through a leg hole 40 selected from a plurality of leg holes through the frame legs 24, and through a matching sleeve hole 42.

For ease of loading and general access to the platform, the platform 12 pivots at a platform first end 44 from the upper parallel side members 16 near the cab rear window 106 between (a) a store position 46 with a platform second end 48 latched to a frame second end 50 securing the platform 12 within the channel 23 between the frame upper side members 16 and (b) a load position 52 with the platform second end 48 unlatched and lowered from the frame. As indicated, the height of the store position of the platform is generally adjusted by the leg length to be above the truck rear window and below the canopy roof to provide an unobstructed view rearward through the truck window and under the platform.

In its load position 52, the unlatched platform second end 48 is supported by support members 56 on each platform side 54 connected between the platform side 54 and the respective upper side member 16. The support member 56 may be a simple strap, or it may comprise a rigid bar with a longitudinal slot 58, in which case a slot pin 60 extends from the upper side member 16 and through the slot 58, sliding in the slot as the platform moves between its store and loading positions, resting on a slot end 62 to support the platform 12 hanging by the support member 56.

The truck rack also may include a lift assist member 64 on each side between the platform 12 and one of the lower parallel side members 18. The lift assist member 64 may include any assist mechanism, such as a spring that is compressed as the platform moves from its store position to its load position, which releases its compression energy to assist the platform as it moves from its load position to its store position.

Having described the truck rack, what is claimed is:

1. A truck rack for use with a pick-up truck having a bed with sides and a rear window in the truck cab forward of the truck bed with a canopy having a roof and sides and support structure mounted on the truck bed, the improvement comprising, a frame mountable on the truck bed sides separate and apart from, within, enclosed by and additional to the canopy, a platform on the frame as a raised flooring above the truck rear window and below the canopy roof providing unobstructed view rearward through the truck window and under the platform, the canopy covering the platform, the platform secured to the frame preventing a platform first end from moving away from a frame first end.

2. A truck rack for use with a pick-up truck having a bed with sides and a rear window in the truck cab forward of the truck bed with a canopy having a roof and sides mounted on the truck bed, the improvement comprising, a frame, including upper parallel side members, mountable directly to the truck bed of the canopy on the truck bed sides separate and apart from, within, enclosed by and additional to the canopy, a platform on the frame as a raised flooring above the truck rear window and below the canopy roof, the platform pivoting from said upper parallel side members and providing unobstructed view rearward through the truck window and under the platform, the canopy covering the platform, the platform secured to the frame preventing a platform first end from moving away from a frame first end, the platform pivoting inside the canopy at the frame first end between a store position and a load position in which a platform second end is lowered from a frame a second end, the store position of the platform generally locating the platform above the truck rear window and below the canopy roof providing unobstructed view rearward through the truck window and under the platform.

3. The truck rack of claim 2 further comprising length-adjustable frame legs depending from the frame, adapted to position the frame and platform over the truck bed above the truck rear window.

4. The truck rack of claim 3 wherein the length-adjustable frame legs further comprise for each leg a sleeve mountable to a truck bed side with an aligned pair of sleeve holes therethrough and a plurality of leg holes through the frame legs and a bolt passing through a selective one of said plurality of leg holes and said sleeve holes.

5. A truck rack for use with a pick-up truck having a bed with sides and a rear window in the truck cab forward of the truck bed with a canopy having a roof and sides mounted on the truck bed, the improvement comprising, a frame, including upper parallel side members, mountable directly to the truck bed of the canopy on the truck bed sides separate and apart from, within, and additional to the canopy, a platform on the frame as a raised flooring above the truck rear window and below the canopy roof, the platform pivoting from said upper parallel side members and providing unobstructed view rearward through the truck window and under the platform, the canopy covering the platform, the platform pivoting from the frame at a platform first end between a store position and a load position in which a platform end is lowered from the frame at a platform second end, the store position of the platform generally locating the platform above the truck rear window and below the canopy roof providing unobstructed view rearward through the truck window and under the platform, first and second cross members between upper parallel side members with the second cross member over the upper parallel side members forming an inverted U channel, and frame legs supporting the upper parallel side members over the truck bed, depending from the upper side members.

6. The truck rack of claim 5 further comprising lower parallel side member mountable to the bed sides, the frame legs extending to the lower parallel side members.

7. The truck rack of claim 5 wherein the platform pivots from a frame first end at a platform first end between (a) said store position with a said platform second end latched to said a frame second end securing the platform in the channel between the frame side members and (b) said loading position with the platform second end lowered from the frame.

8. The truck rack of claim 7 further comprising at least one support member supporting the platform second end in its load position.

9. The truck rack of claim 8 wherein the support member extends between one of said parallel upper side members and one of said frame side members, the support member having a longitudinal slot with a slot pin extending from the side member and through the slot and sliding therein as the platform moves between its store and loading positions, resting on a slot platform end to support the platform hanging by the support member from the frame.

10. The truck rack of claim 7 further comprising at least one lift assist member between the platform and a lower parallel side member, the lift assist member assisting return of the platform from its load position to its store position.

11. A truck rack for use with a pick-up truck having a bed with sides and a rear window in the truck cab forward of the truck bed with a canopy having a roof and sides mounted on the truck bed, the improvement comprising, a frame, including upper parallel side members, mountable directly to the truck bed of the canopy on the truck bed sides separate and apart from, within, and additional to the canopy, a platform on the frame as a raised flooring above the truck rear window and below the canopy roof, the platform pivoting from said upper parallel side members and providing unobstructed view rearward through the truck window and under the platform, the canopy covering the platform, the platform pivoting from the frame at a platform first end between a store position and a load position in which a platform end is lowered from the frame at a platform second end, the store position of the platform generally locating the platform above the truck rear window and below the canopy roof providing unobstructed view rearward through the truck window and under the platform, a plurality of frame mounting brackets securable to the bed sides and extending inward therefrom, adjustably receiving the frame legs at a selective position along the frame mounting bracket inward of the bed sides and within the canopy providing therein a transverse adjustment suitable to accommodate the frame legs with the mounting bracket mountable on truck beds of differing dimensions.

12. A truck rack for use with a pick-up truck having a bed with sides and a rear window in the truck cab forward of the truck bed with a canopy having a roof and sides mounted on the truck bed, the improvement comprising, a frame mountable directly to the truck bed independent of the canopy on the truck bed sides separate and apart from, within and additional to the canopy, comprising upper and lower parallel side members, the lower parallel side members mountable to the bed sides, and first and second cross members between upper parallel side members with the second cross member over the upper parallel side members forming an inverted U channel, a platform on the frame above the truck rear window and below the canopy roof, the platform pivoting from said upper parallel side members and providing unobstructed view rearward through the truck window and under the platform, the canopy covering the platform, the platform pivoting from the frame at a platform first end between a store position and a load position in which a platform end is unlatched and lowered from the frame at a platform second end, the store position of the platform generally locating the platform in the channel between frame side members, above the truck rear window and below the canopy roof, providing unobstructed view rearward through the truck window and under the platform, length-adjustable frame legs extending between the lower and upper side members and adapted to position the frame and platform over the truck bed above the truck rear window, wherein the length-adjustable frame legs comprise for each leg a sleeve mountable to a truck bed side with an aligned pair of sleeve holes therethrough and a plurality of leg holes through the frame legs and a bolt passing through a selective one of said plurality of leg holes and said sleeve holes, a plurality of frame mounting brackets securable to the bed sides and extending inward therefrom, adjustably receiving the frame legs at a selective position along the frame mounting bracket inward of the bed sides and within the canopy providing therein a transverse adjustment suitable to accommodate the frame legs with the mounting bracket mountable on truck beds of differing dimensions, at least one support member supporting the platform second end in its load position, the support member extending between one of said parallel upper side members and one of said frame side members.

13. The truck rack of claim 12 further comprising
a plurality of bracket plates extending inward from truck bed sides when mounted thereon, each bracket having a transverse slot,
a plate bolt through each slot at preferred position along the slot tightened between the sleeve and the bracket plate, thus securing the sleeve in a selective transverse position on the bracket plate inward of and spaced apart from the pickup bed sides and the canopy mounted thereon.

* * * * *